S. B. SIMON.
Improvement in Replaceable Pivots for Watches.
No. 120,335. Patented Oct. 24, 1871.

UNITED STATES PATENT OFFICE.

SIMON B. SIMON, OF NEW YORK, N. Y.

IMPROVEMENT IN REPLACEABLE PIVOTS FOR WATCHES.

Specification forming part of Letters Patent No. 120,335, dated October 24, 1871.

*To all whom it may concern:*

Be it known that I, SIMON B. SIMON, of the city, county, and State of New York, have invented a new and Improved Pivot for Watches; and I do hereby declare that the following is a full, clear, and exact description thereof, which will enable others skilled in the art to make and use the same, reference being had to the accompanying drawing forming part of this specification.

Figure 1:
Figure 2:

Figure 1 represents a sectional side view of the pivot as heretofore applied. Fig. 2 is a sectional side view of my improved tubular pivot.

This invention has for its object to improve the means of repairing broken watch-pivots by the provision for that purpose of tubular repair-pivots, which it is intended to supply to watch-makers for them to keep on hand. When, heretofore, watch-pivots broke from their stems or spikes it was necessary or customary to bore into the remaining end of the spindle and insert a new pivot into the socket thus prepared. It is quite evident that the boring of the very small spindles was a matter of extreme difficulty, requiring delicate handling and tedious operation. It often happened that the spindles or axles broke out while being bored, or that the boring-tools broke off during operation and remained in the spindles, thus making the latter useless, and then it was necessary, first, to soften the spindles for boring, and then reharden the same, thus adding still more to the cost and difficulty of repair. My invention consists in the production of repair-pivots as new articles of manufacture, said pivots having tubular sockets so that they may be slipped upon the ends of the spindles or stems when required, thus dispensing with the necessity of boring the spindles.

In Fig. 1, A represents a watch-spindle or stem on an enlarged scale, showing the socket $a$ formed at one end of it to receive the pivot $b$, as was heretofore the custom to do when the pivot originally on the spindle or stem had been broken off. In Fig. 2, B represents the improved pivot manufactured, to be used as occasion may require. It is made with a tubular socket, $c$, at the inner end. The stem or spindle C, when broken, is provided with a tenon, $d$, which can be easily turned on it, and is then ready to receive the tubular pivot B, as is clearly indicated in Fig. 2. The point or bearing-end of the pivot may be of suitable form and size, according to the kind of stem or spindle, or watch to which it is to be applied.

A watch-maker having an assortment of such tubular pivots will be enabled to rapidly repair broken stems or spindles by merely preparing their ends, by turning, for the reception of the pivots.

Having thus described my invention, I claim as new and desire to secure by Letters Patent—

As a new article of manufacture, a repair-pivot, B, having a tubular socket to receive the end of a watch-spindle or stem, substantially as specified.

SIMON B. SIMON.

Witnesses:
 GEO. W. MABEE,
 T. B. MOSHER.

(36)